(12) United States Patent
Rakshit

(10) Patent No.: US 9,727,540 B2
(45) Date of Patent: *Aug. 8, 2017

(54) METHOD AND SYSTEM OF A USER ASSOCIATING A FIRST WEBPAGE WEB LINK AND SECOND WEBPAGE LINK AND VIEWING OF THE CONTENTS OF THE WEBPAGE LINKS BY THE SELECTION OF THE FIRST WEBPAGE LINK

(71) Applicant: International Business Machines Corporation, Armonk, NY (US)

(72) Inventor: Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 220 days.

This patent is subject to a terminal disclaimer.

(21) Appl. No.: 14/607,116

(22) Filed: Jan. 28, 2015

(65) Prior Publication Data

US 2015/0143217 A1    May 21, 2015

Related U.S. Application Data

(63) Continuation of application No. 12/883,311, filed on Sep. 16, 2010, now Pat. No. 9,003,272.

(51) Int. Cl.
*G06F 17/00*  (2006.01)
*G06F 17/22*  (2006.01)
*G06F 17/30*  (2006.01)

(52) U.S. Cl.
CPC .... *G06F 17/2235* (2013.01); *G06F 17/30884* (2013.01); *G06F 17/2241* (2013.01); *G06F 17/30014* (2013.01)

(58) Field of Classification Search
CPC ............. G06F 17/2235; G06F 17/2241; G06F 17/30014; G06F 17/30884
See application file for complete search history.

(56) References Cited

U.S. PATENT DOCUMENTS 6,032,162 A    2/2000  Burke
6,035,330 A *  3/2000  Astiz ...................... H04L 29/06
                                                     707/999.102

(Continued)

FOREIGN PATENT DOCUMENTS

WO    0055741    9/2000

OTHER PUBLICATIONS

Kokosis et al.; A System for Automatically Organizing Bookmarks; JCD '05; Jun. 7-11, 2005; pp. 155-156.

(Continued)

*Primary Examiner* — Cesar Paula
*Assistant Examiner* — David Faber
(74) *Attorney, Agent, or Firm* — Schmeiser, Olsen & Watts; John Pivnichny

(57) ABSTRACT

A link association method and system. The method involves receiving by a computer processor from a user, a first link for a first Webpage and a second link for a second Webpage. The user determines that the first Webpage is related to the second Webpage. The computer processor receives a specification command indicating that the first Webpage is related to the second Webpage and in response the computer processor associates the first link with the second link. The computer processor stores the first link associated with the second link and generates a report indicating that the first link is related to the second link.

20 Claims, 8 Drawing Sheets

(56) References Cited

U.S. PATENT DOCUMENTS

| | | | |
|---|---|---|---|
| 6,037,934 A | 3/2000 | Himmel et al. | |
| 6,041,360 A | 3/2000 | Himmel et al. | |
| 6,208,995 B1 | 3/2001 | Himmel et al. | |
| 6,211,871 B1 | 4/2001 | Himmel et al. | |
| 6,211,874 B1* | 4/2001 | Himmel | G06F 17/30905 707/E17.121 |
| 6,212,522 B1 | 4/2001 | Himmel et al. | |
| 6,223,178 B1 | 4/2001 | Himmel et al. | |
| 6,247,021 B1 | 6/2001 | Himmel et al. | |
| 6,256,639 B1 | 7/2001 | Himmel et al. | |
| 6,314,423 B1 | 11/2001 | Himmel et al. | |
| 6,324,566 B1 | 11/2001 | Himmel et al. | |
| 6,405,222 B1* | 6/2002 | Kunzinger | G06F 17/30584 |
| 6,408,316 B1 | 6/2002 | Himmel et al. | |
| 6,453,342 B1 | 9/2002 | Himmel et al. | |
| 6,480,852 B1 | 11/2002 | Himmel et al. | |
| 7,324,997 B2 | 1/2008 | Yamada | |
| 7,360,169 B2* | 4/2008 | Duperrouzel | G06F 17/30899 707/E17.121 |
| 7,509,306 B2* | 3/2009 | Boettiger | G06F 17/30631 |
| 7,593,990 B2 | 9/2009 | Himmel et al. | |
| 7,788,322 B2* | 8/2010 | Busey | G06F 17/30899 709/203 |
| 2001/0047375 A1* | 11/2001 | Fest | G06F 17/30899 715/208 |
| 2002/0184095 A1 | 12/2002 | Scullard et al. | |
| 2002/0186251 A1 | 12/2002 | Himmel et al. | |
| 2002/0186252 A1 | 12/2002 | Himmel et al. | |
| 2003/0135562 A1 | 7/2003 | Himmel et al. | |
| 2003/0188263 A1* | 10/2003 | Bates | G06F 17/30884 715/206 |
| 2004/0001106 A1* | 1/2004 | Deutscher | G06F 17/30017 715/838 |
| 2004/0003057 A1* | 1/2004 | Broad | G06F 17/3056 709/219 |
| 2004/0201614 A1* | 10/2004 | Genty | G06F 17/30884 715/738 |
| 2006/0015509 A1 | 1/2006 | Naitou | |
| 2006/0155728 A1* | 7/2006 | Bosarge | G06F 17/30876 |
| 2006/0224967 A1* | 10/2006 | Marmaros | G06F 17/30884 715/738 |
| 2006/0259867 A1 | 11/2006 | Watson et al. | |
| 2007/0271498 A1* | 11/2007 | Schachter | G06F 17/30884 715/205 |
| 2007/0288426 A1* | 12/2007 | Schachter | G06F 17/30884 |
| 2008/0189615 A1* | 8/2008 | Crim | G06Q 30/0241 715/716 |
| 2009/0125533 A1* | 5/2009 | Calbucci | G06F 17/30887 |
| 2009/0254586 A1 | 10/2009 | Barrett | |
| 2010/0010981 A1 | 1/2010 | Rychener | |
| 2010/0050067 A1* | 2/2010 | Curwen | G06F 17/30884 715/206 |
| 2010/0161587 A1 | 6/2010 | Sullivan | |
| 2012/0072816 A1 | 3/2012 | Rakshit | |

OTHER PUBLICATIONS

Li et al.; Power Bookmarks: A System for Personalizable Web Information Organization, Sharing, and Management; Proceedings of the 8th International World Wide Web Conference; Mar. 1, 1999; 19 pages.

SCILnet; Lesson 3 Deleting Bookmarks; Dec. 11, 2000; SCILnet, pp. 1-3; http://web.archive.org/web/200012110536/http://scilnet.fortlewis.edu/edtech/NS_Adv/bm_deleting.htm.

Office Action (Mail Date Aug. 9, 2012) for U.S. Appl. No. 12/883,311, filed Sep. 16, 2010; Confirmation No. 4593.

Amendment filed Nov. 9, 2012 in response to Office Action (Mail Date Aug. 9, 2012) for U.S. Appl. No. 12/883,311, filed Sep. 16, 2010; Confirmation No. 4593.

Final Office Action (Mail Date Nov. 26, 2012) for U.S. Appl. No. 12/883,311, filed Sep. 16, 2010; Confirmation No. 4593.

Request for Continued Examination and Preliminary Amendment filed Feb. 22, 2013 in response to Final Office Action (Mail Date Nov. 26, 2012) for U.S. Appl. No. 12/883,311, filed Sep. 16, 2010; Confirmation No. 4593.

Notice of Allowance (Mail Date Nov. 21, 2014) for U.S. Appl. No. 12/883,311, filed Sep. 16, 2010; Confirmation No. 4593.

* cited by examiner

METHOD AND SYSTEM OF A USER ASSOCIATING A FIRST WEBPAGE WEB LINK AND SECOND WEBPAGE LINK AND VIEWING OF THE CONTENTS OF THE WEBPAGE LINKS BY THE SELECTION OF THE FIRST WEBPAGE LINK

This application is a continuation application claiming priority to Ser. No. 12/883,311 filed Sep. 16, 2010, now U.S. Pat. No. 9,003,272, issued Apr. 7, 2015.

FIELD OF THE INVENTION

The present invention relates to a method and associated system for associating related Web links.

BACKGROUND OF THE INVENTION

Managing related data comprises an inefficient process with little flexibility. Accordingly, there exists a need in the art to overcome the deficiencies and limitations described herein above.

SUMMARY OF THE INVENTION

The present invention provides a method comprising: receiving, by a computer processor of a computing system from a user, a first link for a first Webpage; receiving, by the computer processor, a second link for a second Webpage, wherein the user determines that the first Webpage is related to the second Webpage; receiving, by the computer processor from the user, a specification command indicating that the first Webpage is related to the second Webpage; associating, by the computer processor in response to the receiving the specification command, the first link with the second link; storing, by the computer processor, the first link associated with the second link; and generating, by the computer processor, a report indicating that the first link is related to the second link.

The present invention provides a computer program product, comprising a computer readable storage medium having a computer readable program code embodied therein, the computer readable program code comprising an algorithm that when executed by a computer processor of a computing system implements a method comprising: receiving, by the computer processor from a user, a first link for a first Webpage; receiving, by the computer processor, a second link for a second Webpage, wherein the user determines that the first Webpage is related to the second Webpage; receiving, by the computer processor from the user, a specification command indicating that the first Webpage is related to the second Webpage; associating, by the computer processor in response to the receiving the specification command, the first link with the second link; storing, by the computer processor, the first link associated with the second link; and generating, by the computer processor, a report indicating that the first link is related to the second link.

The present invention provides a computing system comprising a computer processor coupled to a computer-readable memory unit, the memory unit comprising instructions that when executed by the computer processor implements a method comprising: receiving, by the computer processor from a user, a first link for a first Webpage; receiving, by the computer processor, a second link for a second Webpage, wherein the user determines that the first Webpage is related to the second Webpage; receiving, by the computer processor from the user, a specification command indicating that the first Webpage is related to the second Webpage; associating, by the computer processor in response to the receiving the specification command, the first link with the second link; storing, by the computer processor, the first link associated with the second link; and generating, by the computer processor, a report indicating that the first link is related to the second link.

The present invention advantageously provides a simple method and associated system capable of managing related data.

DETAILED DESCRIPTION OF THE INVENTION

Figure 1:
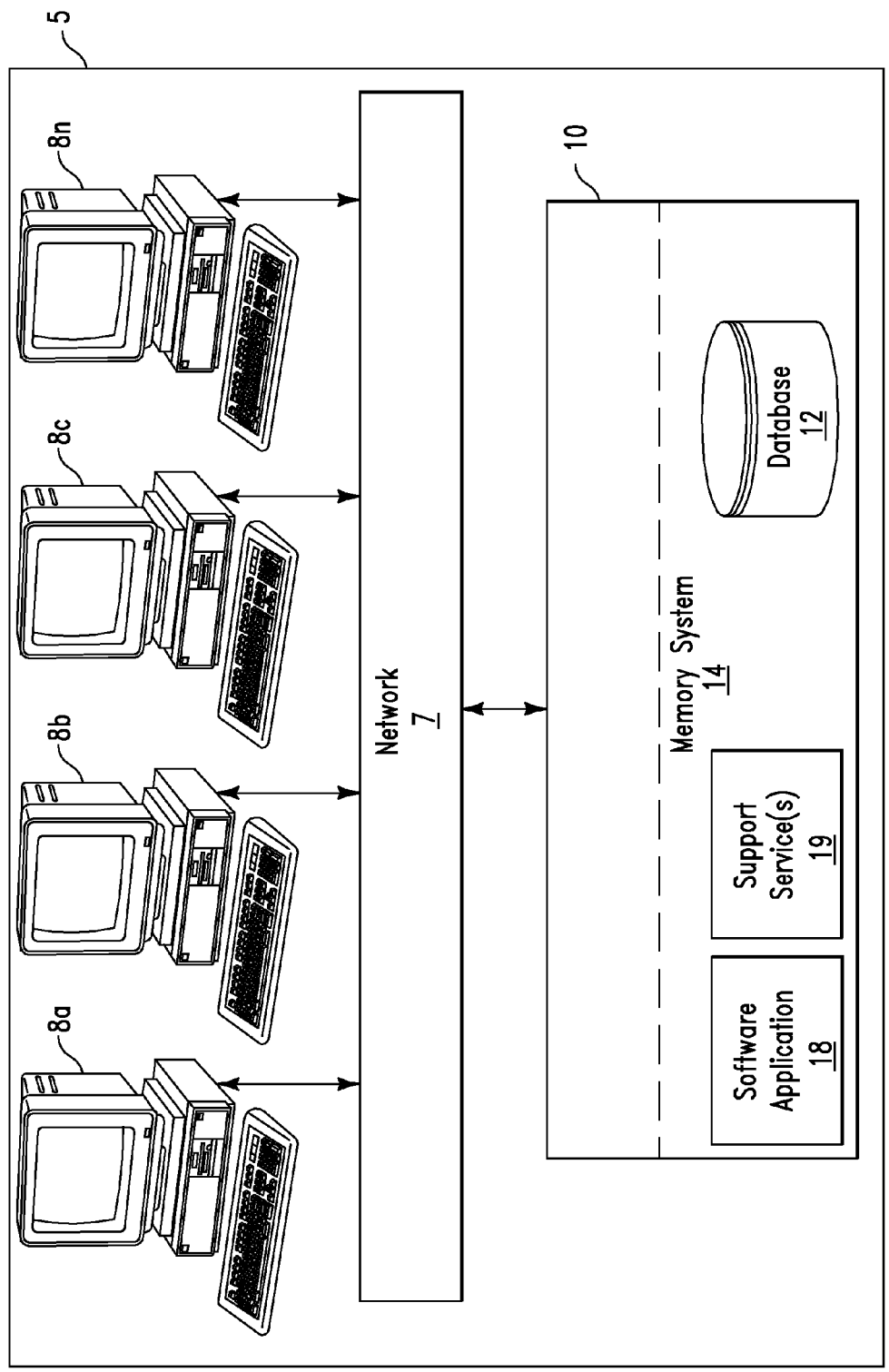
FIG. 1 illustrates a system for associating, storing, and automatically enabling related Web links, in accordance with embodiments of the present invention.

FIG. 1 illustrates a system 5 for associating, storing, and automatically enabling related Web links, in accordance with embodiments of the present invention. System 5 enables a user to store two or more interrelated/interdependent Web links such that if the user opens a first Web link, system 5 will automatically notify (or present to) the user of all interrelated/interdependent Web links. For example, a user stores a first Web link (i.e., linking to a first Webpage comprising an audio/video file for a first song A) in a music folder (e.g., a favorites Web browser folder). Additionally, the user associates (i.e., with the first Web link) and stores a second Web link linking to a second Webpage comprising a text file that includes lyrics to the first song A. Therefore, when the user opens the first Web link, the first Web page and the first Web link are displayed (and enabled) in a first portion of a video display. Additionally (in response to opening the first Web link), the second Web link and the second Webpage are automatically displayed and enabled in a second portion of the video display. Alternatively, if the user opens the second Web link, the second Web page and the second Web link are displayed (and enabled) in a first portion of a video display. Additionally (in response to opening the second Web link), the first Web link and the first Webpage are automatically displayed and enabled in a second portion of the video display. For example, if a student is accessing a first Webpage for e-learning, a selected Web page may be saved in a favorites folder and be associated with additional related Web pages of associated with a same or similar topics. Therefore, if the user opens the first Webpage, he/she will have option to view any of the additional related Web pages. Additionally, the additional related Web pages may be shared in with social networking friends thereby improving a collaborate e-learning process.

System 5 of FIG. 1 comprises devices 8a . . . 8n connected through a network 7 to a computing system 10. Devices 8a . . . 8n may comprise any type of computing devices such as, inter alia, a computer, a PDA, a laptop computer, a tablet computer, a cellular telephone, etc. Network 7 may comprise any type of network including, inter alia, a telephone network, a local area network, (LAN), a wide area network (WAN), the Internet, a wireless network, etc. Computing system 10 may comprise any type of computing system(s) including, inter alia, a computer (PC), a server computer, a database computer, a controller, etc. Computing system 10 comprises a memory system 14. Memory system 14 may comprise a single memory system. Alternatively, memory system 14 may comprise a plurality of memory systems. Memory system 14 comprises a software application 18, a support service(s) 19, and a database 12. The Support service(s) 19 may be created, integrated, hosted, maintained, deployed, managed, serviced, etc. by a service provider who offers to associate, store, and automatically enable related Web links.

Software application 18 enables the following implementation example with respect to for associating, storing, and automatically enabling related Web links:

1. A user opens a first Web page and determines that the first Web page will be saved.
2. The user opens a second Web page and determines that the second Web page is associated with the first Web page.
3. The user determines that if the first Web page is opened then the second Web page should be automatically opened.
4. The user may define that the first Web page and the second Web page are related by associating the links via a graphical user interface (GUI). An associated Web link (i.e., for the second Web page) is stored within metadata of the primary Web link (i.e., for the first Web page).
5. When the user opens the first Web page (via the primary Web link), the associated Web link for the second Web (and the second Web page) is automatically displayed for the user.

FIGS. 2A-2D illustrate screen shots associated with implementation of a process for associating, storing, and automatically enabling related Web links enabled by system 5 of FIG. 1, in accordance with embodiments of the present invention. The screen shots are based on an implementation example associated storing and associating a link A (for a first Web page) with a link B (for a second associated Web page).

Figure 2A:
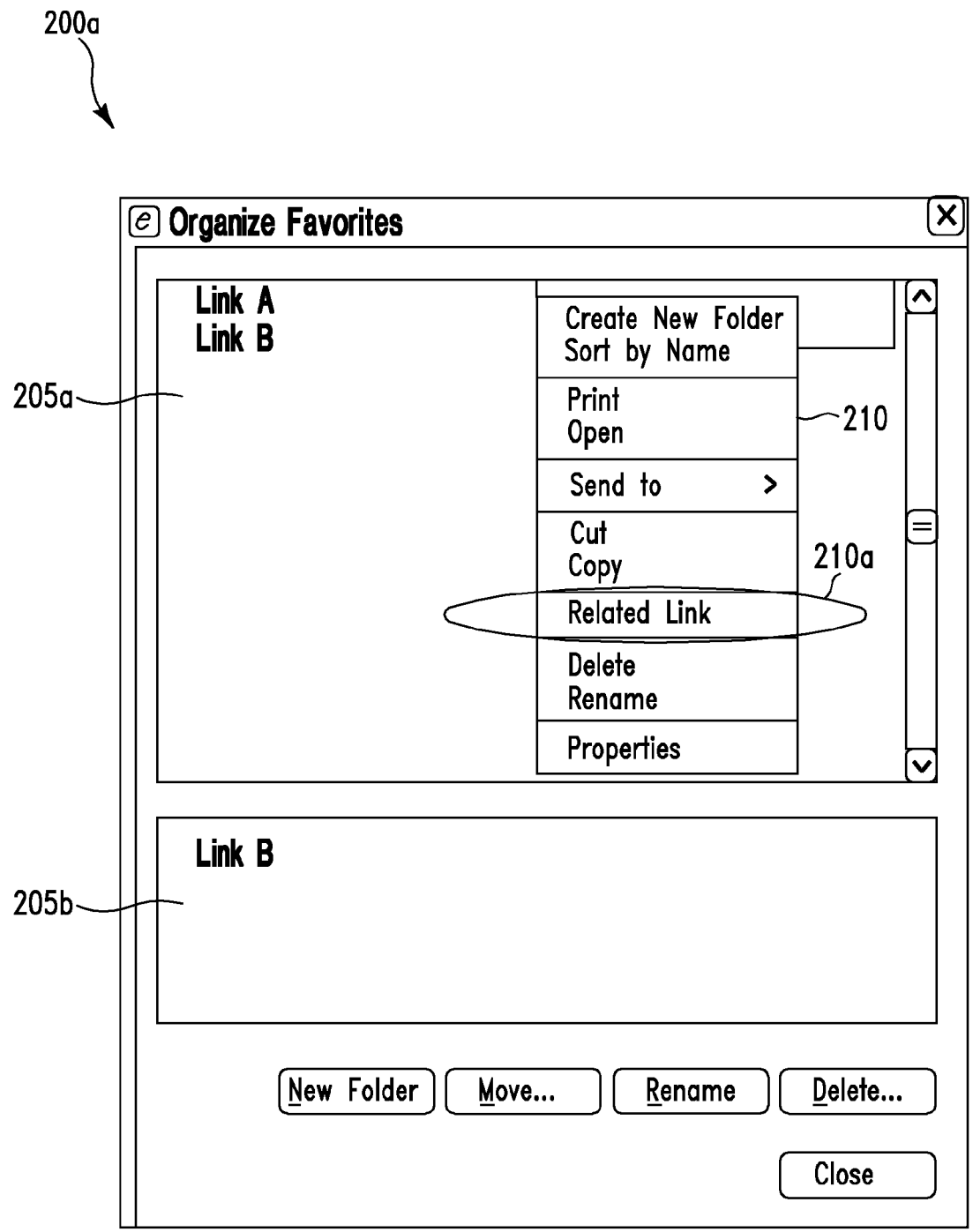
FIGS. 2A-2D illustrate screen shots associated with implementation of a process for associating, storing, and automatically enabling related Web links enabled by the system of FIG. 1, in accordance with embodiments of the present invention.

FIG. 2A illustrates a screen shot 200a of an associating process for link A and link B. In screen shot 200a, a user has saved link A and link B in a favorite folder. The user associates link A with link B by enabling drop down menu 210 and selecting related link selection 210a. Link A and link B are displayed in section 205a of screen shot 200a and associated link B is displayed in section 205b of screen shot 200a. Once the related link (link B) is defined, the original link (link) will be tagged with the related link. The aforementioned information will be stored in a folder.

Figure 2B:
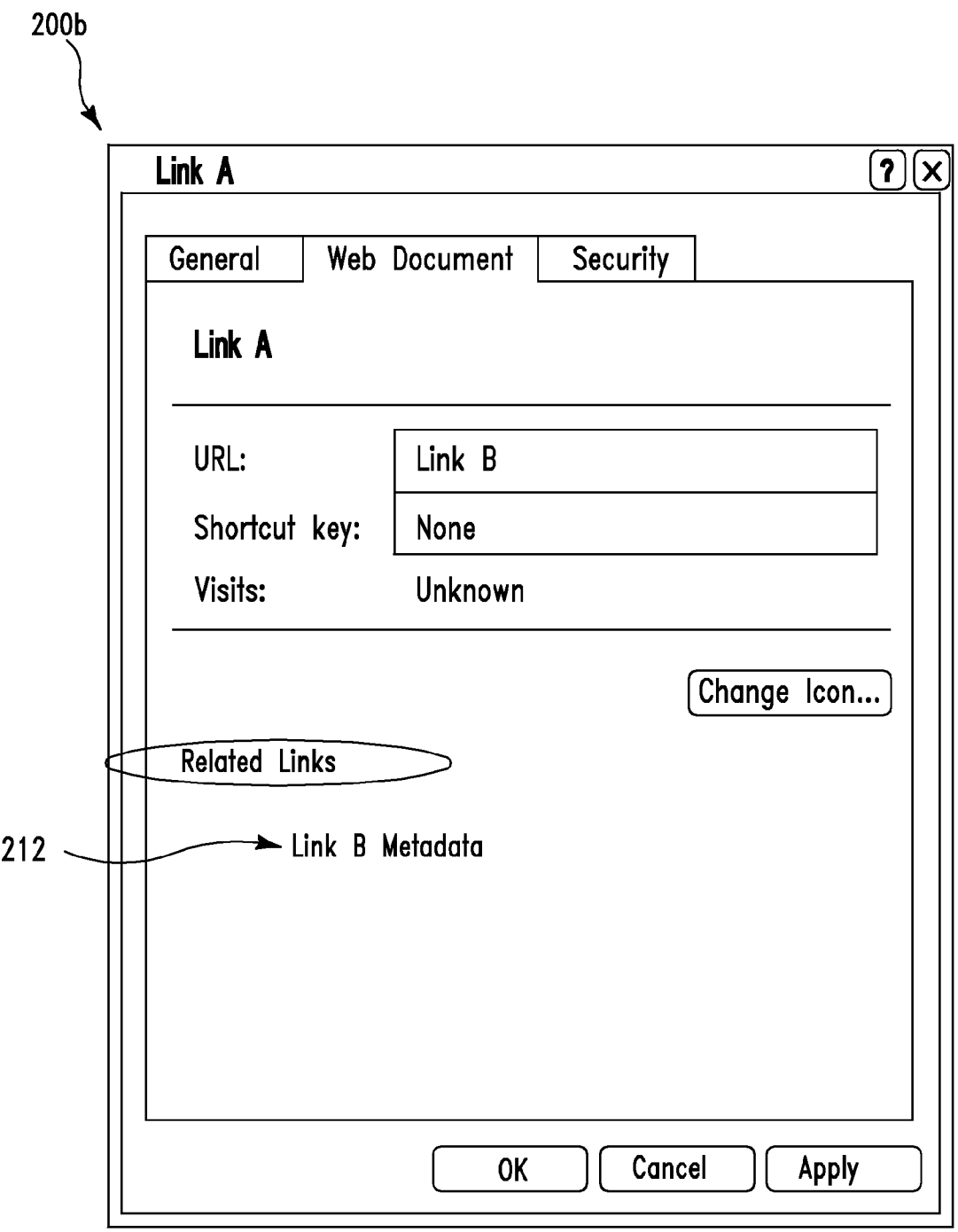

FIG. 2B illustrates a screen shot 200b of the process for linking link A and link B. In screen shot 200b, link B metadata 212 is saved with link A. If a user opens any related links, (e.g., a song or lyrics) the window illustrated in FIG. 2C will open.

Figure 2C:
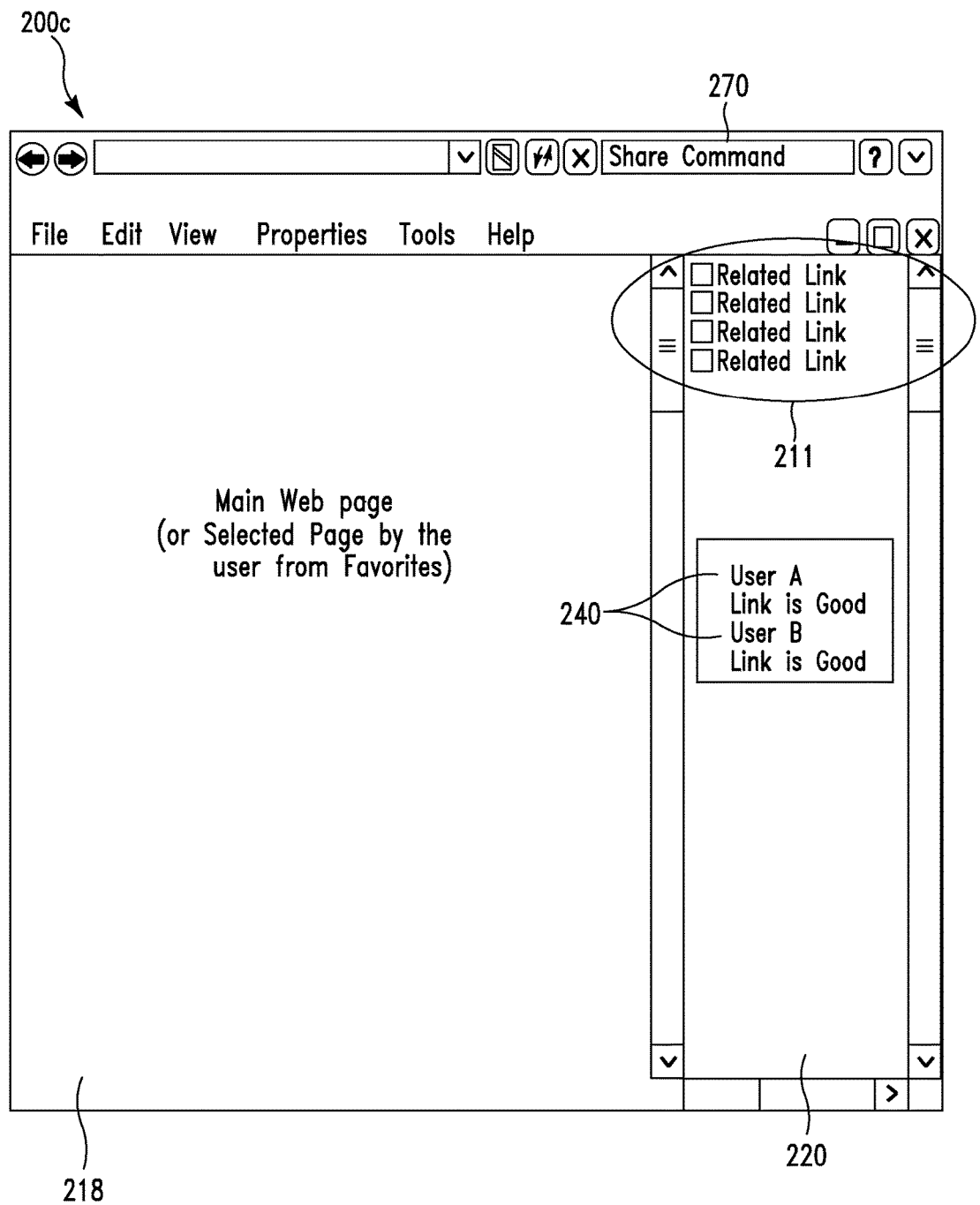

FIG. 2C illustrates a screen shot 200c comprising screen section 218 and screen section 220. Screen section 218 displays a main Web page associated with link A. Screen section 220 displays all main related links 211 (i.e., with link A) which may include link B. Additionally, screen shot 200c may optionally (in response to a share command 270 from a user) allow the user to transmit any of related links 211 to a social networking system and in response screen shot 200c may display comments 240 from social network users.

Figure 2D:
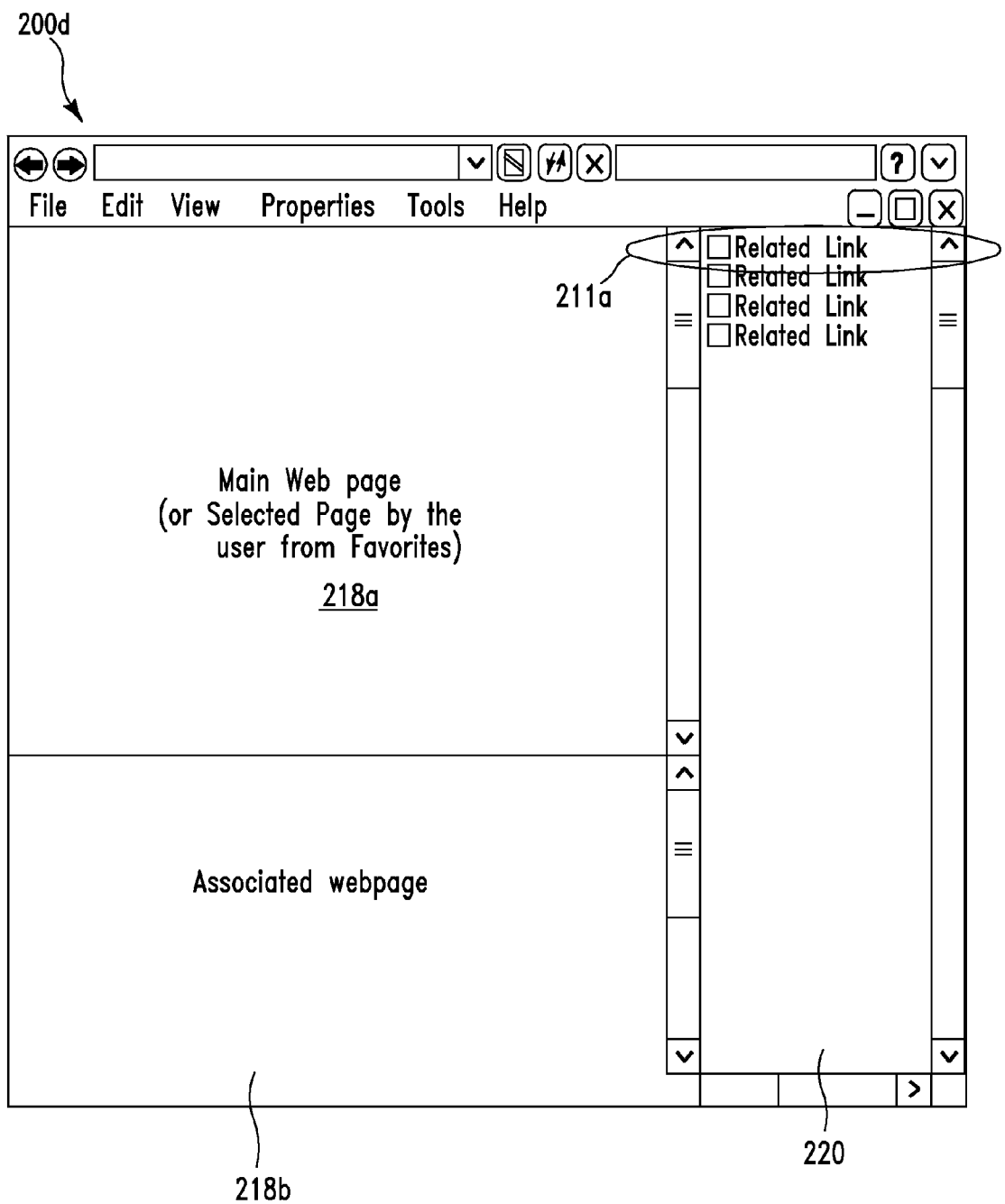

FIG. 2D illustrates a screen shot 200d comprising screen section 218a and 218b and screen section 220. Screen section 218a displays a main Web page associated with link A. Screen section 218b displays a related Web page associated with link 211a. Screen section 220 displays all main related links which may include related link 211.

Figure 3:
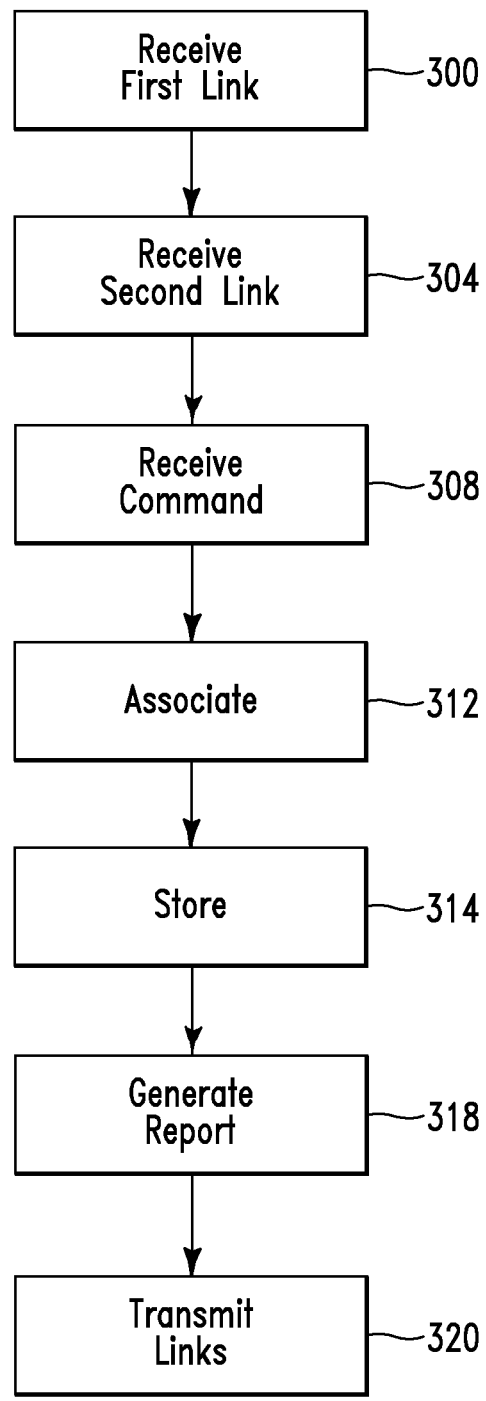
FIG. 3 illustrates an algorithm used by the system of FIG. 1 for implementing a process for associating and storing related Web links, in accordance with embodiments of the present invention.

FIG. 3 illustrates an algorithm used by system 5 of FIG. 1 for implementing a process for associating and storing related Web links, in accordance with embodiments of the present invention. In step 300, a computer processor (i.e., of a computing system such as, inter alia, computing system 10 of FIG. 1) receives (from a user) a first link for a first Webpage. In step 304, the computer processor receives a second link for a second Webpage. The user determines that the first Webpage is related to the second Webpage. In step 308, the computer processor receives (from the user) a specification command indicating that the first Webpage is related to the second Webpage. In step 312, the computer processor associates the first link with the second link. The process described in steps 300-312 may include the following steps:

A. Presenting (to the user) a graphical user interface (GUI) comprising an input box for the first link and the second link.
B. Placing the first link and the second link into the input box.
C. Presenting (via the GUI) a related link command button such that receiving the specification command includes receiving a command for enabling the related link command button and the associating step is in response to enabling the related link command button.

In step 314, the computer processor stores the first link associated with the second link. In step 318, the computer processor generates a report indicating that the first link is related to the second link. In step 320, the computer processor may optionally (in response to a share command from the user) transmit the first link associated with the second link to a social networking system and the social networking system may transmit the first link associated with the second link to a plurality of users associated with the user. Additionally, the computer processor may receive (from one of the plurality of users) comments associated with the first link associated with the second link and the computer processor may present to the user the comments. The computer processor may additionally receive additional links for additional Web pages and associated and store the first link associated with the additional links. Alternatively, the computer processor may receive from the user, a removal command indicating that the first Webpage is not related to the second Webpage and in response the computer processor may disassociated the first link from the second link.

Figure 4:
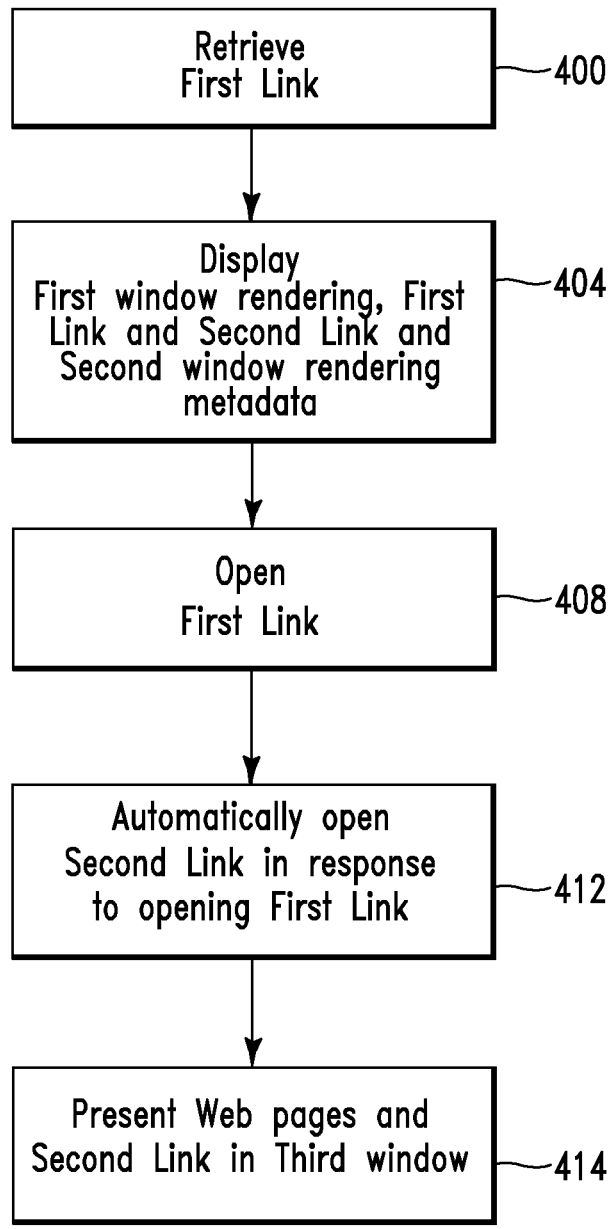
FIG. 4 illustrates an algorithm used by the system of FIG. 1 for implementing a process for automatically enabling related Web links stored using the process described with respect to the algorithm of FIG. 3, in accordance with embodiments of the present invention.

FIG. 4 illustrates an algorithm used by system 5 of FIG. 1 for implementing a process for automatically enabling related Web links stored using the process described with respect to the algorithm of FIG. 3, in accordance with embodiments of the present invention. In step 400, the computer processor (upon receiving a retrieval command from the user) retrieves the first link. In step 404, the computer processor displays a first window rendering the first link and a second link. Additionally, the computer processor displays a second window rendering metadata. In step 408, the computer processor opens the first link. In step 412, the computer processor automatically opens (in response to opening the first link in step 408) the second link. In step 414, the computer processor (i.e., in response to the opening of steps 408 and 412) presents (entirely within a third window) the second link, the first Webpage (associated with the first link), and the second Webpage (associated with the second link) to the user. The first Webpage may be presented on a first portion of a display device of the computing system and the second Webpage may be presented on a second portion (entirely below the first portion) of the display device. Additionally, the computer processor may present (to the user on a third portion (adjacent to and differing from the first portion and second portion) of the display device) a selection for the second link and a plurality of additional links to additional Webpages associated with the first Webpage. The computer processor may sequentially toggle each of the additional Webpages via the display device (i.e., display each of the additional Webpages for a specified amount of time before displaying a next Webpage).

Figure 5:
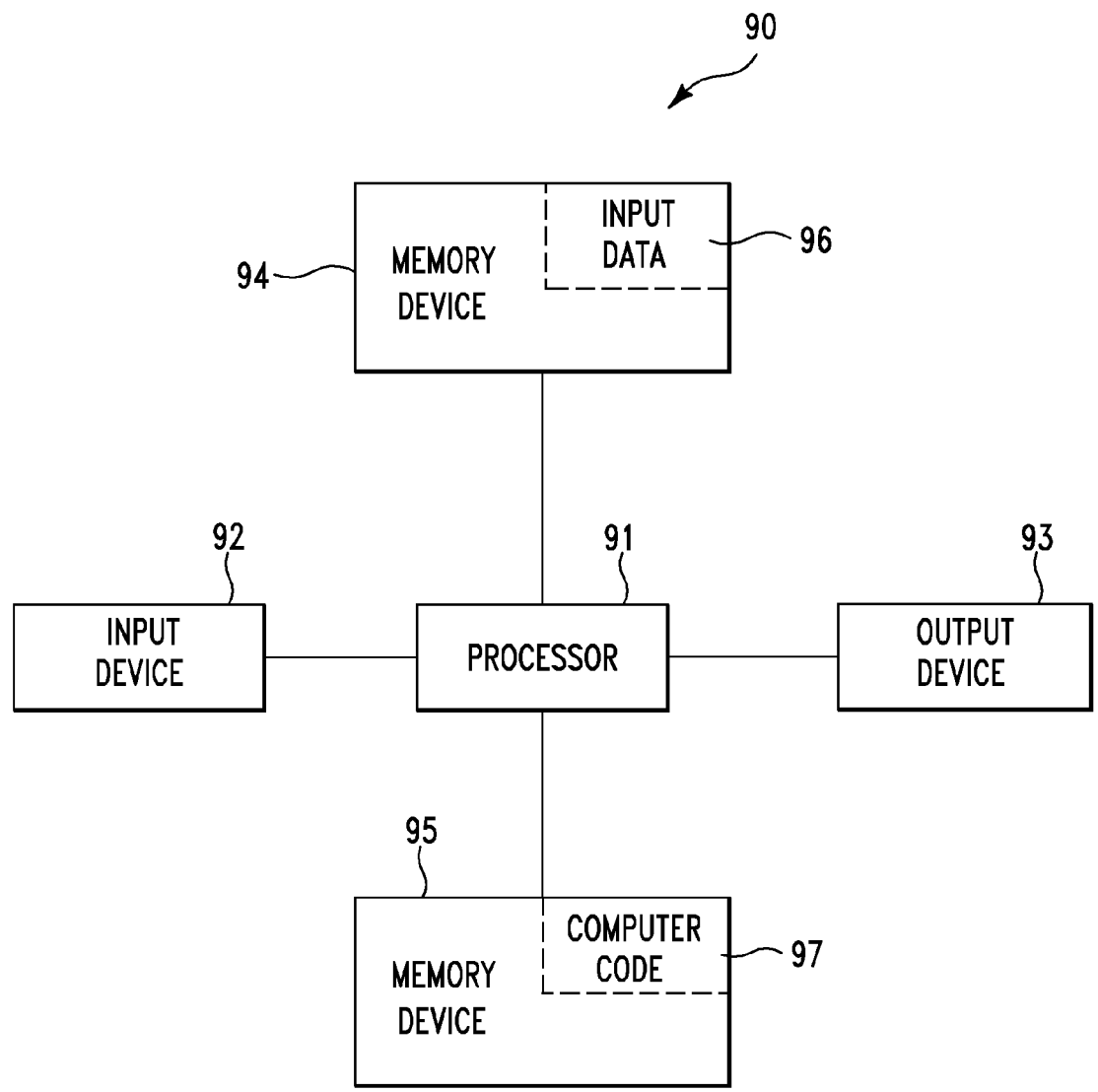
FIG. 5 illustrates a computer apparatus used for associating, storing, and automatically enabling related Web links, in accordance with embodiments of the present invention.

FIG. 5 illustrates a computer apparatus 90 (e.g., computing system 10 of FIG. 1) used for associating, storing, and automatically enabling related Web links, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a software application, a mouse, etc. The output device 93 may be, inter alia, a printer, a plotter, a computer screen, a magnetic tape, a removable hard disk, a floppy disk, a software application, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithms of FIGS. 3 and 4) for associating, storing, and automatically enabling related Web links. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may comprise the algorithms of FIGS. 3 and 4 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise the computer usable medium (or said program storage device).

Still yet, any of the components of the present invention could be created, integrated, hosted, maintained, deployed, managed, serviced, etc. by a service provider who offers to associate, store, and automatically enable related Web links. Thus the present invention discloses a support service 19 (as illustrated in FIG. 1) enabling a process for deploying, creating, integrating, hosting, maintaining, and/or integrating computing infrastructure, comprising integrating computer-readable code into the computer system 90, wherein the code in combination with the computer system 90 is capable of performing a method for associating, storing, and automatically enabling related Web links. In another embodiment, the invention provides a method that performs the process steps of the invention on a subscription, advertising, and/or fee basis. That is, a service provider, such as a Solution Integrator, could offer to associate, store, and automatically enable related Web links. In this case, the service provider can create, maintain, support, etc. a computer infrastructure that performs the process steps of the invention for one or more customers. In return, the service provider can receive payment from the customer(s) under a subscription and/or fee agreement and/or the service provider can receive payment from the sale of advertising content to one or more third parties.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method comprising:

receiving, by a computer processor of a computing system from a user, a first link for a first Webpage comprising an audio/video file;

receiving, by said computer processor, a second link for a second Webpage comprising a text file comprising a text version of the audio/video file, wherein said user determines that said first Webpage is related to said second Webpage;

displaying, by said computer processor to said user on a portion of a display device of said computing system, a first window rendering said first link and said second link;

displaying in response to receiving a specification command indicating that said first Webpage is related to said second Webpage, by said computer processor to said user on an additional portion of said display device during said displaying said first window, said first window rendering said second link, wherein said additional portion is adjacent to and differing from said portion;

associating, by said computer processor in response to said receiving said specification command, said first link with said second link, wherein said associating said first link with said second link comprises associating said second link with metadata comprised by said first link;

storing, by said computer processor, said first link associated with said second link, wherein said storing said first link associated with said second link comprises storing said second link within said metadata comprised by said first link;

presenting, by said computer processor to said user on said display device, said metadata within a second window differing from said first window;

determining, by said computer processor, that said first link is related to said second link;

presenting, by said computer processor to said user, said first link;

first opening, by said computer processor in response to a command from said user, said first link;
presenting on a first portion of said display device of said computing system, by said computer processor to said user in response to said first opening, said first Webpage entirely within a third window;
automatically opening, by said computer processor in response to said first opening, said second link;
presenting on a second portion of said display device, by said computer processor to said user in response to said automatically opening, said second Webpage entirely within said third window, wherein said first portion differs from said second portion, wherein said second portion is entirely below said first portion; and
presenting on a third portion of said display device entirely within said third window, by said computer processor to said user, said second link, wherein said first portion and said second portion are adjacent to and differ from said third portion.

2. The method of claim 1, further comprising:
presenting, by said computer processor to said user on a third portion of said display device, a selection for said second link and a plurality of additional links to additional Webpages associated with said first Webpage; and
sequentially toggling, by said computer processor via said display device, each of said additional Webpages.

3. The method of claim 1, further comprising:
presenting, by said computer processor to said user, a graphical user interface (GUI) comprising an input box for said first link and said second link;
placing within said input box, by said computer processor, said first link and said second link; and
presenting, by said computer processor via said GUI, a related link command button, wherein said receiving said specification command comprises receiving a command for enabling said related link command button, and wherein said associating is further in response to enabling said related link command button.

4. The method of claim 1, further comprising:
receiving, by said computer processor, additional links for additional Webpages, wherein said user determines that said first Webpage is related to said additional Webpages;
receiving, by said computer processor from said user, additional commands indicating that said first Webpage is related to said additional Webpages;
associating, by said computer processor in response to said receiving said additional commands, said first link with said additional links; and
storing, by said computer processor, said first link associated with said additional links.

5. The method of claim 1, wherein said receiving said specification command comprises receiving a command for saving said first link associated with said second link in a favorites folder, and wherein said associating is further in response to said receiving said command for said saving said first link associated with said second link in said favorites folder.

6. The method of claim 1, wherein said storing said first link associated with said second link comprises transmitting said first link associated with said second link to a remote server for storage.

7. The method of claim 1, further comprising:
transmitting, by said computer processor in response to a share command from said user, said first link associated with said second link to a social networking system, wherein said social networking system transmits said first link associated with said second link to a plurality of users associated with said user.

8. The method of claim 7, further comprising:
receiving, by said computer processor from one of said plurality of users, comments associated with said first link associated with said second link; and
presenting, by said computer processor, said first link, said second link, and said comments.

9. The method of claim 1, wherein said user determines that said first Webpage is no longer related to said second Webpage, and wherein said method further comprises:
receiving, by said computer processor from said user, a removal command indicating that said first Webpage is not related to said second Webpage; and
disassociating, by said computer processor in response to said receiving said removal command, said first link from said second link.

10. The method of claim 1, further comprising:
providing at least one support service for at least one of creating, integrating, hosting, maintaining, and deploying computer-readable code in said computing system, wherein the code in combination with the computing system is capable of performing: said receiving said first link, said receiving said second link, said receiving said specification command, said associating, said storing, and said generating.

11. A computer program product, comprising a a non-transitory memory device having a computer readable program code embodied therein, said computer readable program code comprising an algorithm that when executed by a computer processor of a computing system implements a method comprising:
receiving, by said computer processor from a user, a first link for a first Webpage comprising an audio/video file;
receiving, by said computer processor, a second link for a second Webpage comprising a text file comprising a text version of the audio/video file, wherein said user determines that said first Webpage is related to said second Webpage;
displaying, by said computer processor to said user on a portion of a display device of said computing system, a first window rendering said first link and said second link;
displaying in response to receiving a specification command indicating that said first Webpage is related to said second Webpage, by said computer processor to said user on an additional portion of said display device during said displaying said first window, said first window rendering said second link, wherein said additional portion is adjacent to and differing from said portion;
associating, by said computer processor in response to said receiving said specification command, said first link with said second link, wherein said associating said first link with said second link comprises associating said second link with metadata comprised by said first link;
storing, by said computer processor, said first link associated with said second link, wherein said storing said first link associated with said second link comprises storing said second link within said metadata comprised by said first link;
presenting, by said computer processor to said user on said display device, said metadata within a second window differing from said first window;

determining, by said computer processor, that said first link is related to said second link;

presenting, by said computer processor to said user, said first link;

first opening, by said computer processor in response to a command from said user, said first link;

presenting on a first portion of said display device of said computing system, by said computer processor to said user in response to said first opening, said first Webpage entirely within a third window;

automatically opening, by said computer processor in response to said first opening, said second link;

presenting on a second portion of said display device, by said computer processor to said user in response to said automatically opening, said second Webpage entirely within said third window, wherein said first portion differs from said second portion, wherein said second portion is entirely below said first portion; and presenting on a third portion of said display device entirely within said third window, by said computer processor to said user, said second link, wherein said first portion and said second portion are adjacent to and differ from said third portion.

12. The computer program product of claim 11, wherein said method further comprises:

presenting, by said computer processor to said user on a third portion of said display device, a selection for said second link and a plurality of additional links to additional Webpages associated with said first Webpage; and sequentially toggling, by said computer processor via said display device, each of said additional Webpages.

13. The computer program product of claim 11, wherein said method further comprises:

presenting, by said computer processor to said user, a graphical user interface (GUI) comprising an input box for said first link and said second link;

placing within said input box, by said computer processor, said first link and said second link; and presenting, by said computer processor via said GUI, a related link command button, wherein said receiving said specification command comprises receiving a command for enabling said related link command button, and wherein said associating is further in response to enabling said related link command button.

14. A computing system comprising a computer processor coupled to a computer-readable memory unit, said computer processor comprising hardware, said memory unit comprising instructions that when executed by the computer processor implements a method comprising:

receiving, by said computer processor from a user, a first link for a first Webpage comprising an audio/video file;

receiving, by said computer processor, a second link for a second Webpage comprising a text file comprising a text version of the audio/video file, wherein said user determines that said first Webpage is related to said second Webpage;

displaying, by said computer processor to said user on a portion of a display device of said computing system, a first window rendering said first link and said second link;

displaying in response to receiving a specification command indicating that said first Webpage is related to said second Webpage, by said computer processor to said user on an additional portion of said display device during said displaying said first window, said first window rendering said second link, wherein said additional portion is adjacent to and differing from said portion;

associating, by said computer processor in response to said receiving said specification command, said first link with said second link, wherein said associating said first link with said second link comprises associating said second link with metadata comprised by said first link;

storing, by said computer processor, said first link associated with said second link, wherein said storing said first link associated with said second link comprises storing said second link within said metadata comprised by said first link;

presenting, by said computer processor to said user on said display device, said metadata within a second window differing from said first window;

determining, by said computer processor, that said first link is related to said second link;

presenting, by said computer processor to said user, said first link;

first opening, by said computer processor in response to a command from said user, said first link;

presenting on a first portion of said display device of said computing system, by said computer processor to said user in response to said first opening, said first Webpage entirely within a third window;

automatically opening, by said computer processor in response to said first opening, said second link;

presenting on a second portion of said display device, by said computer processor to said user in response to said automatically opening, said second Webpage entirely within said third window, wherein said first portion differs from said second portion, wherein said second portion is entirely below said first portion; and presenting on a third portion of said display device entirely within said third window, by said computer processor to said user, said second link, wherein said first portion and said second portion are adjacent to and differ from said third portion.

15. The computing system of claim 14, wherein said method further comprises:

presenting, by said computer processor to said user on a third portion of said display device, a selection for said second link and a plurality of additional links to additional Webpages associated with said first Webpage; and sequentially toggling, by said computer processor via said display device, each of said additional Webpages.

16. The computing system of claim 14, wherein said method further comprises:

presenting, by said computer processor to said user, a graphical user interface (GUI) comprising an input box for said first link and said second link;

placing within said input box, by said computer processor, said first link and said second link; and presenting, by said computer processor via said GUI, a related link command button, wherein said receiving said specification command comprises receiving a command for enabling said related link command button, and wherein said associating is further in response to enabling said related link command button.

17. The computing system of claim 14, wherein said method further comprises:

receiving, by said computer processor, additional links for additional Webpages, wherein said user determines that said first Webpage is related to said additional Webpages;

receiving, by said computer processor from said user, additional commands indicating that said first Webpage is related to said additional Webpages;

associating, by said computer processor in response to said receiving said additional commands, said first link with said additional links; and storing, by said computer processor, said first link associated with said additional links.

18. The computing system of claim 14, wherein said receiving said specification command comprises receiving a command for saving said first link associated with said second link in a favorites folder, and wherein said associating is further in response to said receiving said command for said saving said first link associated with said second link in said favorites folder.

19. The computing system of claim 14, wherein said storing said first link associated with said second link comprises transmitting said first link associated with said second link to a remote server for storage.

20. The computing system of claim 14, wherein said method further comprises:

transmitting, by said computer processor in response to a share command from said user, said first link associated with said second link to a social networking system, wherein said social networking system transmits said first link associated with said second link to a plurality of users associated with said user.

* * * * *